(12) United States Patent
Travers

(10) Patent No.: US 12,275,344 B2
(45) Date of Patent: Apr. 15, 2025

(54) TOOLS AND METHODS FOR HANDLING TOWER SECTIONS

(71) Applicant: General Electric Renovables Espana, S.L., Barcelona (ES)

(72) Inventor: Alexis Travers, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 354 days.

(21) Appl. No.: 17/689,247

(22) Filed: Mar. 8, 2022

(65) Prior Publication Data

US 2022/0289098 A1    Sep. 15, 2022

(30) Foreign Application Priority Data

Mar. 9, 2021   (EP) ..................... 21382192

(51) Int. Cl.
*F03D 13/40* (2016.01)
*B60P 3/40* (2006.01)
*F03D 13/20* (2016.01)

(52) U.S. Cl.
CPC ............... *B60P 3/40* (2013.01); *F03D 13/40* (2016.05); *F03D 13/20* (2016.05); *F05B 2230/61* (2013.01); *F05B 2260/02* (2013.01)

(58) Field of Classification Search
CPC ........ F03D 13/20; F03D 13/40; F03D 13/201; F05B 2230/50; F05B 2230/61; F05B 2240/941; F05B 2260/02
See application file for complete search history.

(56) References Cited

U.S. PATENT DOCUMENTS

| | | | |
|---|---|---|---|
| 9,199,570 B2 | 12/2015 | Pedersen et al. | |
| 9,732,726 B2 | 8/2017 | Botwright | |
| 2019/0301431 A1* | 10/2019 | Üyünük | ................. B25B 1/205 |
| 2022/0260057 A1* | 8/2022 | Falkenberg | ............ F03D 13/25 |

FOREIGN PATENT DOCUMENTS

| | | |
|---|---|---|
| CN | 110758224 A | 2/2020 |
| DE | 202016100449 U1 | 5/2017 |

OTHER PUBLICATIONS

European Search Report Corresponding to EP21382192.9 on Aug. 26, 2021.

* cited by examiner

*Primary Examiner* — Christopher J. Besler
(74) *Attorney, Agent, or Firm* — Dority & Manning, P.A.

(57) ABSTRACT

The present disclosure relates to tools and methods for handling a tower section of a wind turbine tower. A tool comprises a first wheeled platform, a second wheeled platform, and a frame. The frame comprises a first side portion, and a second side portion. The first side portion is attached to the first wheeled platform and is configured to support a first end portion of a sling. The second side portion is attached to the second wheeled platform and is configured to support a second end portion of the sling. The first and second wheeled platforms are separated along a horizontal direction.

6 Claims, 6 Drawing Sheets

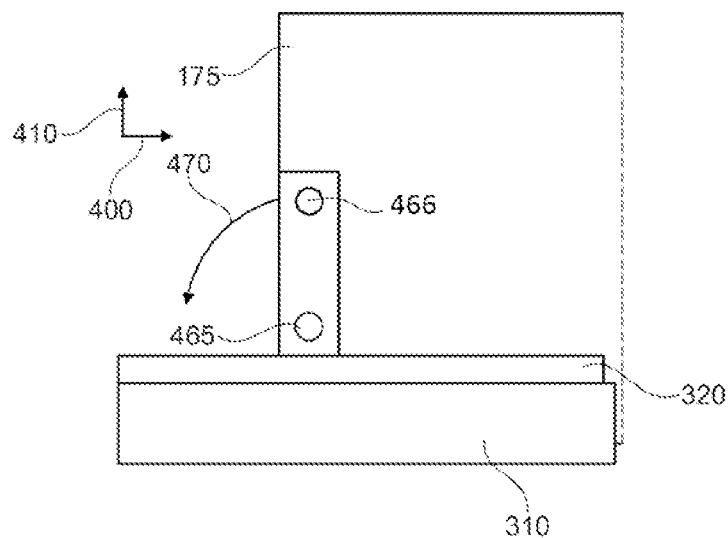
Fig. 5
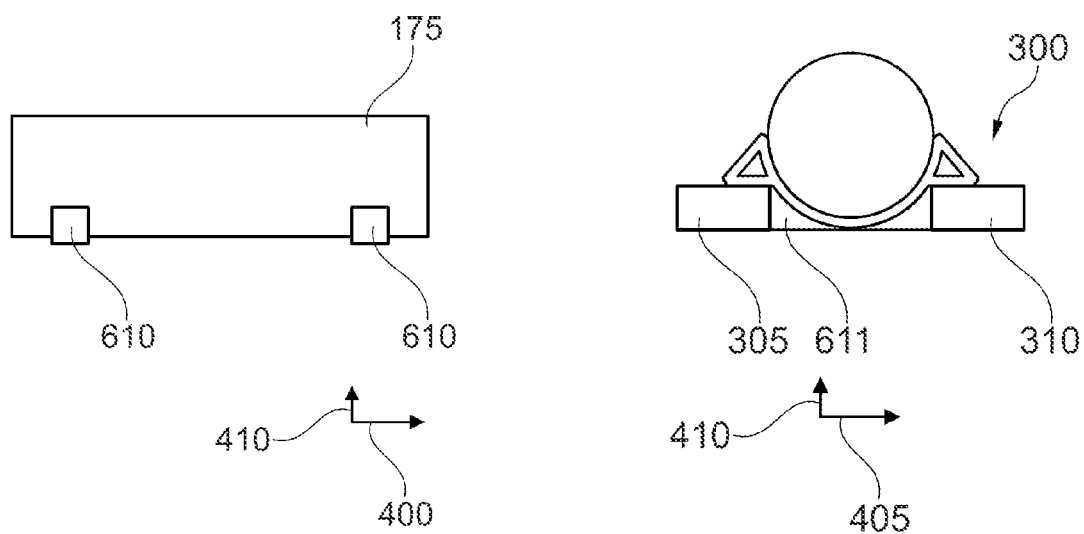
Fig. 6A
Fig. 6B

TOOLS AND METHODS FOR HANDLING TOWER SECTIONS

The present disclosure relates to wind turbines, in particular to methods and tools for handling a wind turbine tower section.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

Modern wind turbines have grown increasingly more powerful and correspondingly larger. Wind turbines able to provide a rated power above 10 MW may have towers exceeding 130 m in height and 800 tons in weight. The diameter of sections of the tower may be between 5 and 10 m or even more. For example, a tower top diameter may be above 5 m and a tower base diameter may be above 8 m.

Modern wind turbine towers thus have dimensions that makes it difficult and expensive to transport and erect them. A wind turbine tower may be divided into sections for enabling their transport by available vehicles and tools, and also for respecting dimensions and weight limits that a country or region may impose. A tower section may still be complicated to transport, for example a tower section may have a diameter between 5 and 10 m, may weigh over 300 tons, and may have a length of 20 meters, 30 meters, 40 meters or more.

After manufacture of a tower section, the tower section may be stored on supports such as cradles or "elephant feet". The tower section may be picked up and transported by self-propelled modular transporters (SPMTs). One or more cranes with slights may be used to lift up such a tower section from atop an SPMT and may be placed on a vessel for further transportation. On a vessel, sea fastening may be used. When the vessel has reached a logistic hub, cranes may be used for lifting the tower sections on to the shore and the tower sections may be stored again. In such a process, again SPMTs may be used. For storage and pre-assembly, the tower sections may be upended. Specifically, two cranes may be used for the upending. One crane may lift the tower at or near one end of the section, and another crane may lift the tower at or near the opposite end.

Sometimes, frames are attached to one or more tower sections to be stored and/or transported. For example, one frame may be bolted to a flange of a first end of a tower section, and another frame may be bolted to a flange of the opposite end of the tower section. These frames may be substantially flat. A frame may extend over a whole cross-section of an end of a tower piece or may only extend partially over it.

A frame may additionally or alternatively extend along a length or height of a tower section. This extension may likewise be total or partial. In this explanation, a length or height direction is substantially perpendicular to a radial cross-section of a tower section.

These frames may be picked up and lifted by vehicles such as self-propelled modular transports (SPMTs) for transporting the tower sections from a storage hub to an installation site or to vessels. Cranes and sufficiently large and long tow trucks may also be used to this end. Frames may also be picked up and lifted by cranes in order to put one or more tower sections in a vertical position (tower diameter parallel to the ground).

Such frames may not be directly placed on the ground for storing one or more tower sections, but on supporting elements instead. These elements may help to reduce frame damage and to level and better support the one or more tower sections. For example, four "elephant feet" per tower section or group of tower sections to be stored together may be used (two elephant feet at each end of the section).

The use of frames requires time for attaching the frames to each tower section or group of tower sections to be stored and/or transported, and then for detaching them at an installation site. Sometimes one or more frames may be removed before upending the tower sections, and in any case all frames are removed after upending the tower sections. In addition, frames suitable for a certain tower section or tower diameter may not be suitable for other diameters. Adequate placement of supporting elements for tower section storage also needs time and substantial effort.

SUMMARY

In an aspect of the present disclosure, a tool for handling a tower section of a wind turbine tower is provided. The tool comprises a first wheeled platform, a second wheeled platform and a frame. The frame has a first side portion, and a second side portion. The first side portion of the frame is attached to the first wheeled platform and is configured to support a first end portion of a sling. The second side portion of the frame is attached to the second wheeled platform and is configured to support a second end portion of the sling. The first and second wheeled platforms are separated along a horizontal direction such that the tower section can be supported on the sling at least partially between the first and second side portions of the frame.

According to this aspect, the tool has two wheeled platforms for moving on the ground. A frame is mounted on the platforms, thereby setting a distance between them and making the movement of a platform dependent on the movement of the other platform. The first and second platforms are separated, i.e. the distance between them provided by the frame extending in the direction of connection is greater than zero. Actually, the distance between them may allow a portion of a wind turbine tower to hang between them, depending on the diameter of the tower section and the height of the frame. The side portions of the frame are configured to support a sling such that a sling attached to the tool may hang between the side portions of the frame.

Such a tool may enable picking up and carrying a portion of a tower of a wind turbine in an efficient way. Time may be saved in transport and upending of a wind turbine tower section with respect to the use of storing and/or transport frames. Transportation and upending may therefore also be facilitated due to the use of a single tool instead of at least a transportation tool and two frames.

In a further aspect, a method for handling a wind turbine tower section is provided. The method comprises supporting a first end of a tower section placed on one or more supports by a first sling hanging between a first side portion of a frame attached to a first wheeled platform and a second side portion of the frame attached to a second wheeled platform of a first tool, and supporting a second end of the tower section by a second sling hanging between a first side portion of the frame attached to a first wheeled platform and a second side portion of the frame attached to a second wheeled platform of a second tool. The method further comprises removing the one or more supports.

In yet a further aspect, a tool for handling a tower section of a wind turbine tower is provided. The tool comprises a first base and a second base configured to move on a ground and a frame extending between the first and the second bases. The first frame side is supported by the first base and a second opposite frame side is supported by the second base. The first and second bases are arranged substantially parallel to each other in such a way that a tower section can be supported by the frame between the first and second bases.

Throughout this disclosure, a tower section may be understood as one tower section or as a group of two or more tower sections joined together. For example, a single tower section may be stored and transported alone, or a group of joined tower sections, e.g. three tower sections, may be stored and transported together.

BRIEF DESCRIPTION OF THE DRAWINGS

FIG. 5 schematically illustrates an example of a lateral view of a tool for transporting and upending a wind turbine tower section;

FIG. 6A to 6E schematically illustrate several details of a method for transporting and optionally upending a wind turbine tower section.

DETAILED DESCRIPTION OF EXAMPLES

Figure 1:
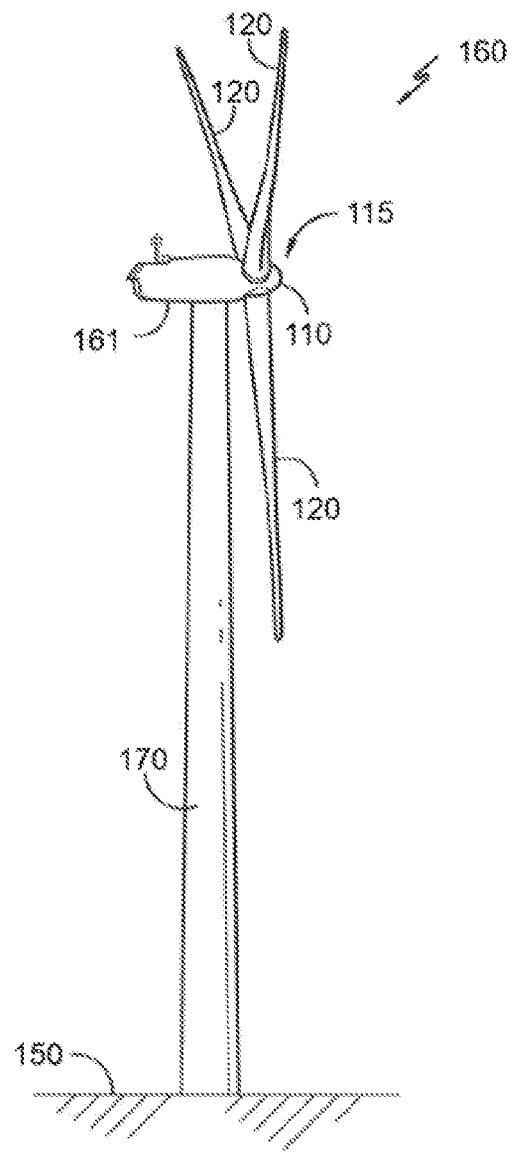
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
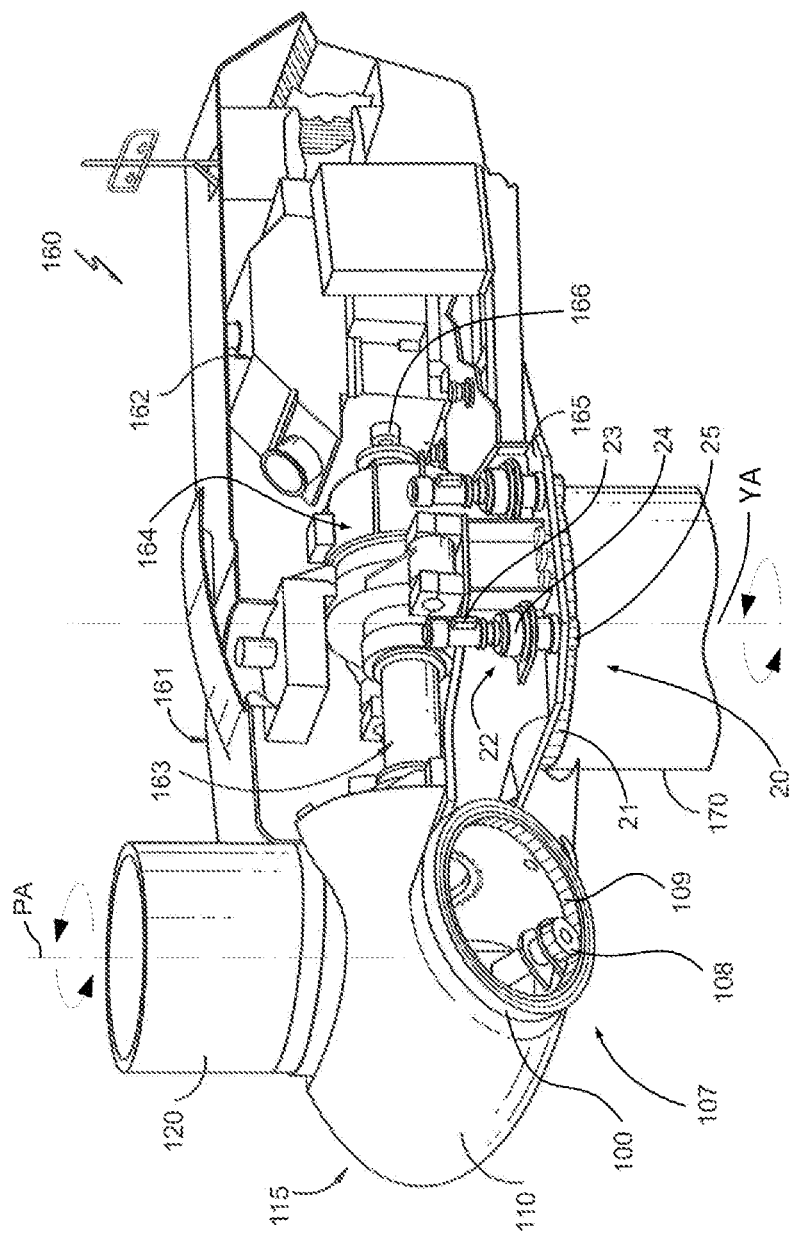
FIG. 2 illustrates a simplified, internal view of one example of the nacelle of the wind turbine of FIG. 1.

FIG. 2 illustrates a simplified, internal view of one example of the nacelle 161 of the wind turbine 160 of FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 may be rotatably coupled to the tower 170 through a yaw system 20 in such a way that the nacelle 161 is able to rotate about a yaw axis YA, or there may be other ways to position the rotor in the desired angle to the wind. If there is a yaw system 20, such system will usually comprise a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

One aspect of the present disclosure provides a tool for handling, e.g. transporting and/or upending, a tower section of a wind turbine tower. The tool comprises a first wheeled platform, a second wheeled platform and a frame. The frame has a first side portion, and a second side portion. The first side portion of the frame is attached to the first wheeled platform and is configured to support a first end portion of a sling. The second side portion of the frame is attached to the second wheeled platform and is configured to support a second end portion of the sling. The first and second wheeled platforms are separated along a frame horizontal direction such that the tower section can be supported on the sling at least partially between the first and second side portions of the frame.

Figure 3:
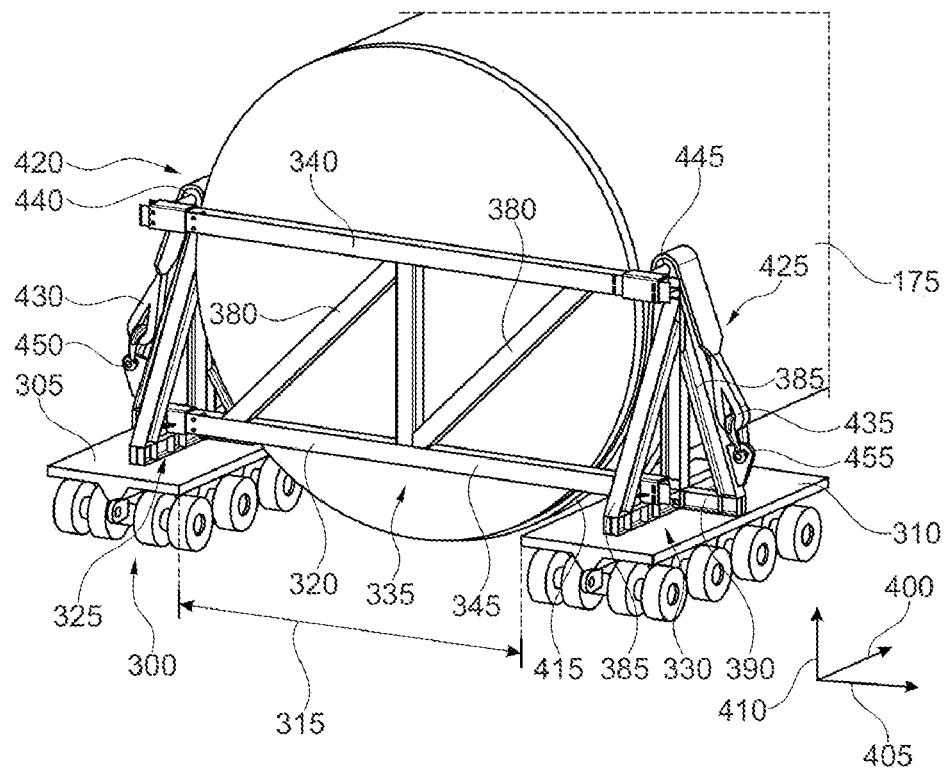
FIG. 3 schematically illustrates an example of a tool for transporting and upending a wind turbine tower section.
Figure 4:
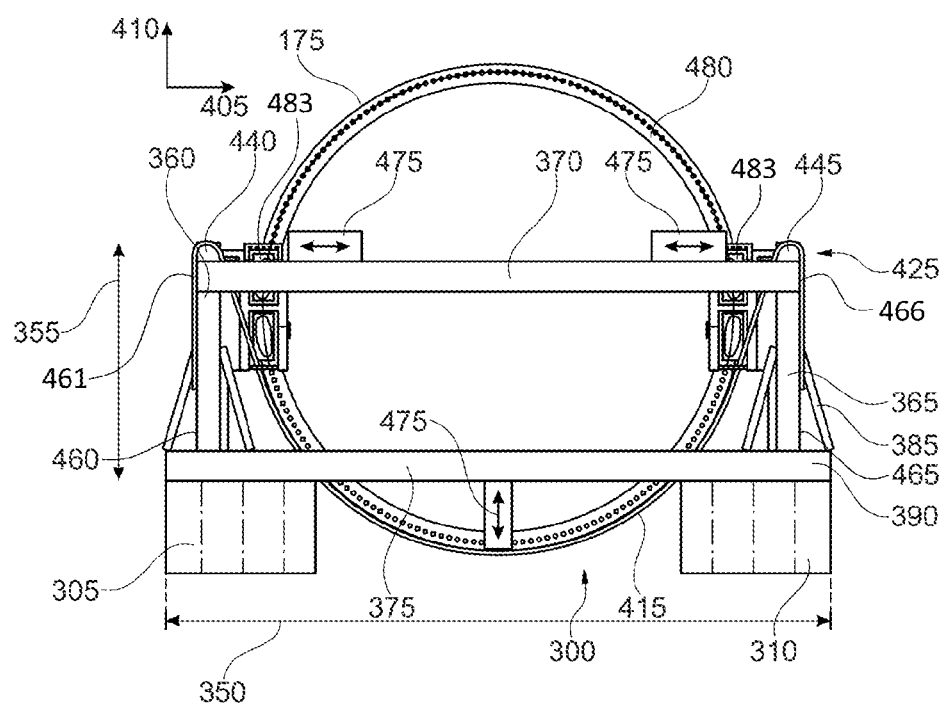
FIG. 4 schematically illustrates an example of a front or rear view of a tool for transporting and upending a wind turbine tower section.

Two similar examples of this tool may be seen in FIGS. 3 and 4. FIG. 3 shows a perspective view of a tool 300 and a wind turbine tower section 175 supported by the tool 300. FIG. 4 shows a front view of another tool 300 supporting a wind turbine tower section 175. The tool 300 comprises a first wheeled platform 305 and a second wheeled platform 310. The first 305 and second 310 wheeled platforms are separated a distance 315.

The tool 300 also comprises a frame 320. The frame 320 includes a first side portion 325, a second side portion 330 and a central portion 335. The central portion 335 connects the first and second side portions and may bridge a gap between the two wheeled platforms. The frame 320 also has a top portion 340 and a bottom portion 345. The frame 320 separates the first 305 and second 310 wheeled platforms along a substantially horizontal direction 405. The frame 320 also extends along a vertical direction 410. The tool 300 may move over the ground along a transportation direction 400. Direction 405 may also be called a lateral horizontal direction and direction 410 may be called vertical direction 410.

The frame 320 may be longer along a horizontal direction 405 than along a frame vertical direction 410, as in the examples of FIGS. 3 and 4. In other words, the frame may be longer than it is high. A length 350 of the frame 320 may for example be between 5 and 15 meters and a height 355 of the frame may for example be between between 5 and 15 meters, and a width of the frame 320 may be between 2 and 6 meters. In other examples, the frame 320 may be longer in a vertical direction 310 and thus a length of the frame 320 may extend along a vertical direction 310 instead of a lateral horizontal direction 405.

The first 305 and second 310 platforms may have a distance between them of 4-13 meters in some examples.

Each of the wheeled platforms may comprise a substantially flatbed base and a plurality of wheels, e.g. between 8 and 20 wheels. Sets of wheels may be arranged on common axles. Each of the wheeled platforms may comprise an independent propulsion mechanism. The wheeled platforms may be SPMTs.

The first side portion of the frame 325 is attached to the first wheeled platform 305 and the second side portion of the frame 330 is attached to the second wheeled platform 310. Attachment may be for instance be by nuts and bolts. The frame first 325 and second 330 side portions may extend in a vertical direction 410. The first side portion of the frame 325 may include a first substantially vertical beam 360. Likewise, the second side portion of the frame 330 may include a second substantially vertical beam 365.

The first side portion of the frame 325 may comprise one or more inclined additional beams or struts 385. Alternatively or additionally, the second first side portion of the frame 330 may comprise one or more inclined additional beams or struts 385. An inclined additional beam 385 may extend from an upper (see FIG. 3) or a middle portion (see FIG. 4) of the first vertical beam 360 to the first wheeled platform 305 or to a base beam 390.

One or more of the additional base beams 390 may extend in a direction substantially parallel to the lateral horizontal direction 405, as in FIGS. 3 and 4. One or more of the additional base beams 390 may extend in a direction substantially parallel to the transport horizontal direction 400, as in FIG. 3. One or more additional base beams 390 may extend in any other direction. The additional beams 385, 390 may help to stabilize and reinforce the frame first 325 and second 330 side portions.

The first 325 and second 330 side portions of the frame are configured to support first 420 and second 425 end portions of a sling 415, respectively. An end portion of a sling 420, 425 may be understood as a portion of a sling 415 close to an end 430, 435 of the sling 415. An end 430, 435 of a sling 415 may be included in and end portion 420, 425 of a sling 415. The first side portion of the frame 325 may comprise suitable sling attachments.

In some examples, the first side portion of the frame 325 may comprise one or more first sling attachment points 450 for attaching a first end 430 of the sling 415, and the second side portion of the frame 330 may comprise one or more second attachment points 455 for attaching the second end 435 of the sling 415. One or more sling attachment points 450, 455 may be D-rings, as shown in FIG. 4.

Having several sling attachment points 450, 455 at different heights in a side portion 325, 330 of the frame enables adjusting a sling 415 and the extent to which the sling hangs between the side portions 325, 330 of the frame. Therefore, with a single tool 300, tower sections 175 of different diameters may be transported.

The first side portion 325 of the frame 320, for example a vertical beam 360, may comprise a sling top guide 440; and the second side portion 330 of the frame 320, for example a vertical beam 365, may comprise a second top guide 445. The first 440 and second 445 top guides are configured to support a sling 415.

One or more sling attachment points 450, 455 and a top 440, 450 of the first 325 and second 330 side portions of the frame which supports and redirects the sling may be in a plane that includes the vertical 410 and the lateral horizontal 405 directions. This may help to stabilize and better support a tower section 175.

In FIG. 4, sling attachment points 450, 455 are provided in an inclined additional beam 385. However, sling attachment points 450, 455 may be provided in other places of the frame side portions 325, 330. For example, they could be provided in a vertical beam 360, 365 of the frame side portions 325, 330. Sling attachment points 450, 455 may be also provided on the first 305 and/or second 310 wheeled platforms.

Sling attachments may be provided relatively close to a base of the wheeled platforms. The sling ends may extend from the attachment points over a top 440, 445 of the first and second frame side portions 325, 330.

The central portion of the frame 335 may include a truss structure having one or more beams connecting the frame first 320 and second 330 side portions. For example, the central portion of the frame 335 may comprise a top lateral beam 370 and a bottom lateral beam 375. These beams 370, 375 may extend in a lateral horizontal direction 405. These beams 370, 375 may be bolted to vertical beams 360 and 365.

The truss structure of the central portion of the frame 335 may include vertical members or beams and diagonal members of beams 380. In FIG. 3 central inclined beams 380 connect lateral horizontal beams 370 and 375. In other examples, one or more central inclined beams 380 may connect the frame first 325 and second 220 side portions. Central inclined beams 380 may be present in addition to or as an alternative to lateral horizontal beams 370, 375.

It should be noted that a central top beam 370 may not lie exactly above a central bottom beam 375 in FIGS. 3 and 4. Such beam 370 may be displaced in a transport horizontal direction 400 and away from the sling attachment points 450, 455 for permitting a sling 115 to hang in a plane formed by the vertical 410 and lateral horizontal 405 directions.

A central top beam 370 may limit the displacement of a tower section 175 when supported by a sling 115 and may therefore help to stabilize the tower section 174 during transportation.

Diagonal beams 380 may have different inclination angles with respect to a lateral horizontal direction 405, for example each inclined beam 380 may have an inclination of 30°, or 45°, or 60°. Inclined beams 380 may also have different inclination angles than other inclined beams 380. For example, an inclined beam 380 may have an angle of 45° with respect to the lateral horizontal direction 405 and another inclined beam may have an angle of 125° with respect to direction 405.

A frame 320 may in some examples be made of steel. A frame 320 may be integrally formed of a single piece or may comprise two or more pieces or beams joined to each other.

FIG. 5 schematically illustrates a lateral view of a tool 300. In some examples, as in FIGS. 4 and 5, the tool 300 may include hinges 460, 461, 465, 466. The first side portion of the frame 325 may include at least a first hinge 460, 461 and the second side portion of the frame 330 may include at least a second hinge 465, 466 for rotating the frame 320 or a portion of the frame 320 about an axis substantially parallel to a frame horizontal direction 405. In FIG. 5, arrow 470 indicates the movement of the frame 320 or a portion of the frame 320 when rotation about an axis in the lateral horizontal direction 405 occurs.

This may facilitate upending a tower section 175 once carried to an installation site. Also, instead of using two cranes for upending a tower section 175, namely a tail crane and a main crane, only a main crane may be used. The movement of a tower section 175 during upending may be more easily controlled with this tool 300 and a crane than with two cranes.

Hinges may be provided at a bottom of the first 325 and second 330 side portions of the frame. Additionally or alternatively, hinges may be provided at a top of the first 325 and second 330 side portions of the frame. For example, one or more hinges may be provided per vertical beam 360, 365 of a side portion 325, 550 of the frame 320.

FIGS. 4 and 5 schematically show two hinges per side portion of the frame. In this example, the first side portion of the frame 325, in particular the first vertical beam 360, includes a top hinge 461 and a bottom hinge 460. Likewise, the second side portion of the frame 330, in particular the second vertical beam 365, includes a top hinge 466 and a bottom hinge 465.

The bottom hinges 460, 465 may be used to start to rotate a tower portion 175 at the beginning of the upending process whereas the top hinges 461, 466 may be used to rotate the tower portion 175 subsequently, towards the end of the upending process. In some other examples, only top hinges 461, 466 may be used to rotate a tower portion 175 during upending.

In some examples, the tool 300 may comprise a sling 415 having a first end 430 configured to be attached to the first side portion of the frame 325 and a second end 435 configured to be attached to the second side portion of the frame 330, the sling 415 being configured to support a tower section 175.

FIGS. 3 and 4 show the tool 300 including a sling 415. A first end 430 of a sling 415 may be attached to a first sling attachment point 450, and a second opposite end 435 of the sling 415 may be attached to a second sling attachment point 455.

A first end portion 420 of the sling 415 may pass over a top guide 440 of the first side portion 325 of the frame 320, and a second end portion 425 of the sling 415 may pass over a top guide 445 of the second side portion 330 of the frame 330, supporting and redirecting the sling. An end 430, 435 of a sling 415 may include an eye which may be attached to e.g. a D-ring by a shackle.

The sling 415 may therefore hang between the frame first 325 and second 330 side portions. The sling 415 may also hang between the first 305 and second 310 wheeled platforms. Attaching the sling 415 in higher or lower attachment points 450, 455 of a frame side portion 325, 330 enables to let a sling 415 to hang more or less, i.e. be closer or further away from the ground.

A sling 415 may have a length between 10 and 60 m. A sling 415 may be flat. In some examples, a sling 415 may be made of polyester or nylon. In some other examples, a sling may be made of leather or metal such as steel.

In some examples, a tool 300 may comprise one or more tower section flange clamps 475. As it can be seen in FIG. 4, these clamps 475 may be attached to the frame 320, for example to a central portion 335 of the frame 320, and they may be retractable. Once a wind turbine tower section 175 is placed on a sling 415, the fasteners 475 may be moved towards the tower section for securing it. In the example of FIG. 4, two clamps may move in a lateral horizontal direction 405 and one may move in a vertical direction 410. A tower section flange clamp 475 may clamp or grip an interior surface of the tower section 175. Stability of the tower section 175 may be enhanced. In some examples, clamps 475 may only be used for securing the tower section 185 when upending.

The example of FIG. 4 also shows two lifting lugs 483 to which a lifting device, e.g. a main crane (see FIG. 6E), may be attached.

A further aspect of the invention provides a method 500 for handling a wind turbine tower section 170. The method 500 may use two tools 300 according to any of the examples described above. Handling may include specifically transporting and upending a tower section. Handling may also include picking, lifting, and/or storing a tower section.

FIGS. 6A to 6E schematically show some details of the method. The orientation of a wind turbine tower section 175 and one or more tools 300 is indicated by direction arrows 400, 405 and 410. 400 corresponds to a longitudinal direction of the tower section. 405 corresponds to a transverse or width direction of the tower section. 410 corresponds to a vertical direction.

The method comprises, at step 510, supporting a first end of a tower section 175 placed on one or more supports 610 for storage by a first sling 415 hanging between a first side portion of the frame 325 attached to a first wheeled platform 305 and a second side portion of the frame 330 attached to a second wheeled platform 310 of a tool 300.

The supports 610 may be supporting elements configured particularly for storage.

As schematically illustrated in FIG. 6A, for storage, a tower section 175 may be placed on supports 610, for example on two cradles. A first tool 300 with a sling 415 may approach a first end of the tower section 175 such that the first end of the tower section 175 lies between a first 325 and second 330 side portions of the frame 320 of the tool 300. This is schematically illustrated in FIG. 6B and may also be seen in FIGS. 3 and 4.

A sling 415 may lift, e.g. slightly lift, the first end of the tower section 175. This may be performed by adjusting a distance of the platform of the first wheeled platform 305 to the ground. For example, the platform may be hydraulically adjusted in a vertical direction 410 to lift a first tower section end. The first wheeled platform 305 may be a self-propelled modular transport (SPMT). The sling 415 may adapt to a contour of the tower section end, as illustrated e.g. in FIG. 6B. Alternatively, lifting may occur by stretching or pulling the sling.

The method further comprises, at step 520, supporting a second end of the tower section 175 by a second sling 415 hanging between a first side portion of the frame 325 attached to a first wheeled platform 305 and a second side portion of the frame 330 attached to a second wheeled platform 310 of a second tool 300.

The second end of the wind turbine portion 175 may be supported in a same manner as the first end of the wind turbine portion 175. The tool frame 320, in particular a central portion 336 of the frame 320, may be in direct contact with a portion of a tower section flange 480 (see FIG. 4). This may limit the movement of the tower section 175 in a transport horizontal direction 400 and therefore help to stabilize the tower section 175 during its transport.

The method further comprises, at block 530, removing the one or more storage supporting elements 610. As the supporting elements are no longer needed for supporting the tower section 175, they may be moved from below the tower section 175.

Figure 6C:
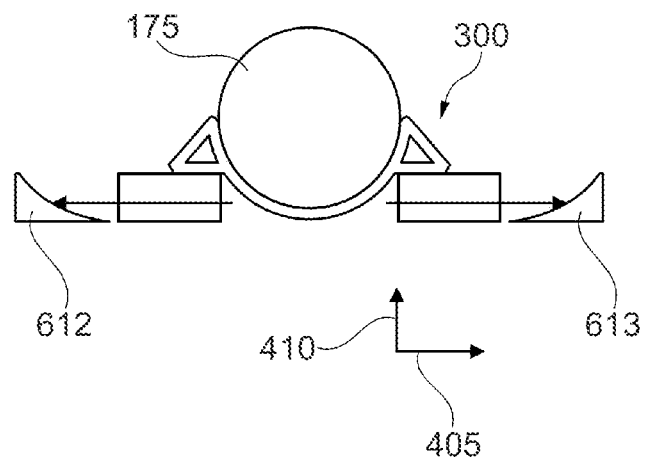

One or more operators may move the supporting elements 610 away from the tower section 175. If a supporting element 610 is a cradle 611, removing a cradle may comprise separating the cradle 611 into two portions. This is schematically illustrated in FIG. 6C. A cradle 611 may comprise a first portion 612, e.g. a first half of the cradle, and a second portion 613, e.g. a second half of the cradle, joined to one another e.g. by a pin. Each cradle portion 612, 613 may be removed e.g. by a forklift moving in a lateral horizontal direction 405.

Figure 6D:
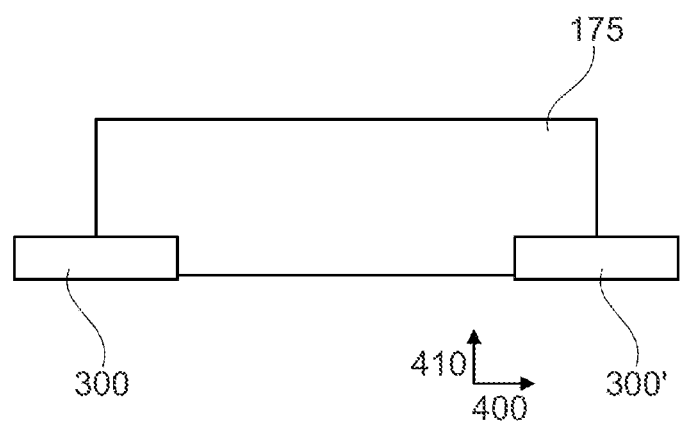

The method 500 may further comprise, at block 540, transporting the tower section 175. Now that two tools 300 are supporting the tower section 175 and that the supports 610 where it was stored are not in the way of the tool 300, the first 305 and second 310 wheeled platforms of the first tool 300 and the first 305 and second 310 wheeled platforms of the second tool 300 may move the tower section 175. The movement may for example be in a transport direction 400, although movement in any other horizontal direction (i.e. in the plane formed by directions 400 and 405) is possible. FIG. 6D schematically represents a tower section 175 being carried by two tools 300, 300' in a transport direction 400.

The use of tools 300, 300' may facilitate and make the handling and transport of a wind turbine tower section 175 more efficient.

Figure 6E:
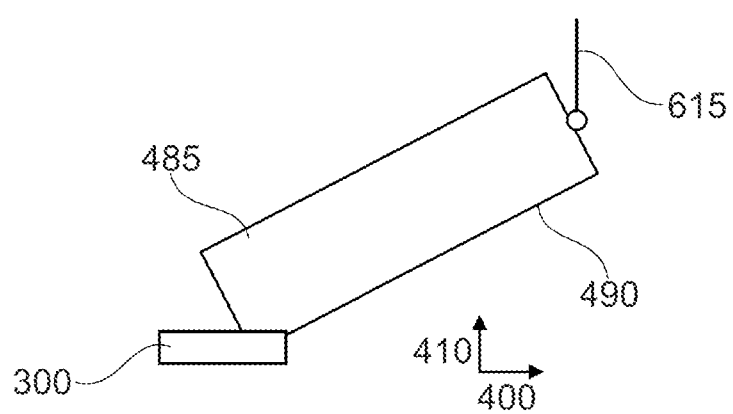
Figure 7:
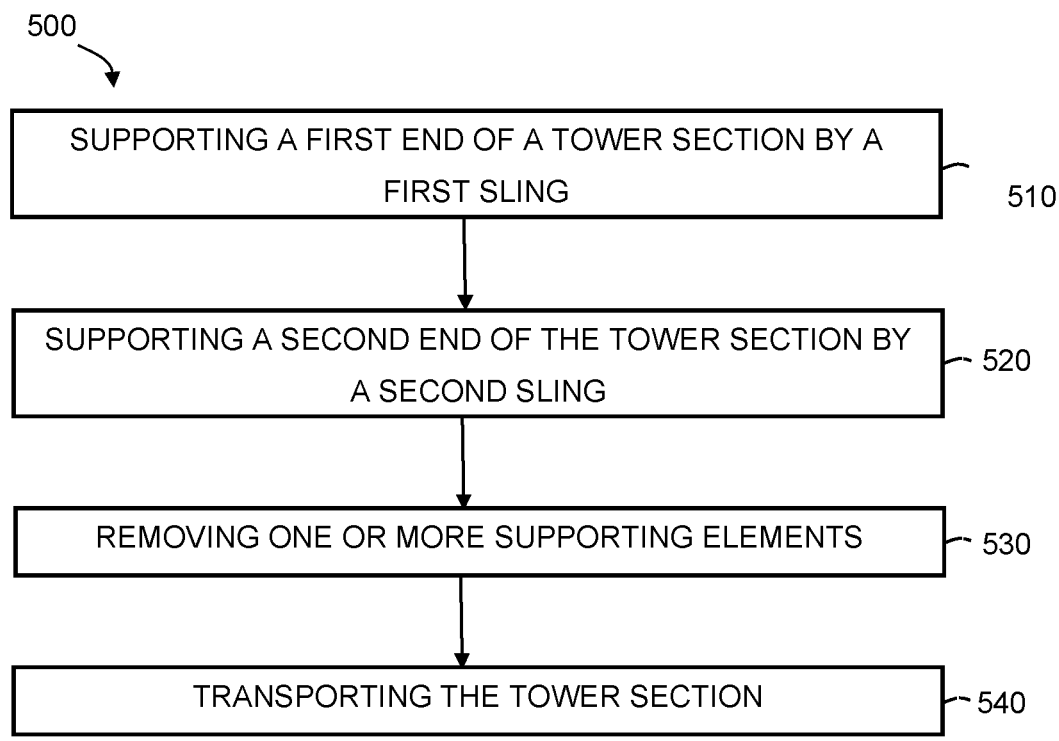
FIG. 7 schematically illustrates an example of a method for handling a wind turbine tower section.

The method 500 may further comprise upending the tower section 175 by lifting one tower section end while the other tower section end is supported by the tool 300. FIG. 6E schematically illustrates such a situation. Once the wind turbine tower section 175 has been carried to an upending site by the two tools 300, 300', an end of the tower section may be held by a lifting device, e.g. a crane. The tool previously supporting that end may or may not be removed. When comparing FIGS. 6D and 6E, it can be seen that tool 300' has been removed and that a line 615, e.g. of a crane, is lifting the tower section end which will remain on top after upending. Tool 300 may enable upending of a tower section 175 in a more stable and controlled manner than when using e.g. a tail crane and a main crane.

Upending may comprise in some examples rotating the first 325 and second 330 side portions of the frame of the tool 300 supporting one end of the tower section about an axis substantially parallel to a horizontal direction 405. The tool 300 may help to put the tower section 175 in, or close to, a vertical position (see FIGS. 5 and 6D). One or more hinges 460, 461, 465, 466 per side of the frame 325, 330 may be used. This may also facilitate upending of the tower section in comparison to when a tail crane and a main crane are used.

In some examples, the method may further comprise securing a tower section to be placed at the bottom by clamping a flange 480 of a tower section. Clamps 475 or other gripping elements may be extendable and retractable from the tool 300, e.g. from a frame center portion 335 of the tool 300 (see FIG. 4). At least an interior surface of the tower section 175 may be clamped before the other tower end portion is lifted for upending. For example, tool 300 may include one or more fasteners 475 which may clamp a bottom 485 of the tower section 175 in FIG. 6 before line 615 lifts, or even before line is attached to, a top 490 of the tower section 175. Control and stabilization of the tower section may be enhanced by using the clamps 475.

In some examples, the method may further comprise transferring the tower section 175 to a vessel for further transport. This step may be performed if, for example, the tower section 175 is manufactured or stored at a certain place and it has to be transported over the sea to an installation or upending site. In some examples, the tower section 175 may be lifted from the tools 300, 300' to do so.

In such a case, the tower section 175 may be positioned as in FIG. 6D, and one or more lifting devices, e.g. two cranes, may lift it. In some examples, two slings may be used to hoist the tower section. The tower section 175 may then be positioned and secured on a boat, e.g. it may be attached to a vessel deck.

In order to support and secure the tower section 175 to a vessel, one or more supporting elements 610 may be attached to the tower section before placing it on the vessel, e.g. while supported by tools 300, 300' and before lifting it. One or more cradles 611, e.g. two cradles, may be secured, e.g. bolted, to the tower section 175 before lifting it and placing it on a vessel deck.

The tower section 175 may be alternatively placed on one or more supporting elements 610 attached to a vessel. One or more cradles 611 may be e.g welded to the vessel deck, and the tower section may be placed on the cradles 611. Additional fastening of the tower section 175 to the vessel deck may be provided independently of whether the tower section supporting means 610 are attached to it or to a vessel.

Instead of lifting the tower section 175 for placing it on a vessel, roll-on/roll-off (RoRo) may be used.

Still in some other examples, the tower section 175 may be carried into the vessel by the tools 300, 300', without the need of lifting devices and lifting lines 615.

Typically, depending on the logistics of a wind site and on the logistics of manufacturing, the tower section(s) may first be transported to a logistical hub for later transportation to individual sites. If the tower section 175 is to be upended onshore, the method may further comprise taking the tower section out of the vessel and transporting it on two tools 300, 300'.

If the tower section 175 is on supporting devices 610 on the vessel, the tower section 175 may be lifted to take it out of the vessel. The tower section 175 may in some examples first be placed on one or more supports 610 for temporary storage and then picked up by two tools 300, 300' as already explained with respect to FIGS. 6A to 6D. The tower may then be carried to an installation site and may be upended as explained with respect to FIG. 6E.

If the two tools 300, 300' have moved the tower section 175 to the vessel deck, they may likewise move it out of the vessel.

If the tower section 175 is to be transported offshore and it is placed on supporting elements 610 on the vessel, it may be lifted from the vessel deck by one or more lifting devices, such as cranes. In this case attaching the supporting elements 610 to the vessel may be ease the process with respect to attaching them to the tower section 175.

If the tower section 175 has be carried into the vessel by the tools 300, 300', the tower section 175 may be upended as explained with respect to FIG. 6E.

Still a further aspect of the invention provides another tool for transporting and upending a tower section 175 of a wind turbine tower 170. The tool 300 comprises a first base 305 and a second base 310 configured to move on a ground. The tool 300 further comprises a frame 320 extending between the first 305 and the second 310 bases, a first frame side 325 being supported by the first base 305 and a second opposite frame side 330 being supported by the second base 330. The first and second bases are arranged substantially parallel to each other in such a way that a tower section can be supported by the frame between the first and second bases. The frame 320 may be configured for permitting a sling 415 attached to the tool 300 to hang between the first 305 and second 310 frame sides.

The first 305 and second 310 bases may have a substantially flat upper portion mounted to moving elements such as wheels. Each of the first 305 and second 310 bases may be an SPMT any may have suitable driving or propulsion systems.

As the frame 320 extends between the first 305 and second 310 bases, the bases 305, 310 are separated in this direction in which the frame extends 405. The frame 320 may include a plurality of beams and may be made of steel. The frame 320 may be bolted to the first 305 and second 310 movable bases.

A sling 415 configured to support an end tower section 175 may be attached to the tool 300. An end 430 of the sling 415 may be attached to the first frame side 325 and the other end 435 of the sling 415 may be attached to the second frame side 330. Additionally or alternatively, a first sling end 430 may be attached to the first base 305 and the opposite end 435 of the sling 415 may be attached to the second base 310.

The first frame side 325 may comprise two or more sling fasteners 450 at different heights and the second frame side 330 may comprise two or more sling fasteners 455 at different heights. Once attached to the tool 300, the sling 415 may hang between the frame first 325 and second 330 sides, and optionally also between the first 305 and second movable bases.

In some examples, the first frame side 325 may comprise at least a first hinge 460, 461 and the second frame side 330 may comprise at least a second hinge 465 for rotating the frame about a substantially horizontal axis 405. In some examples, the frame 320 may comprise one or more retractable clamping devices 475 for fixing a wind turbine tower section flange 480 to the tool 300. The explanation provided with respect to FIGS. 3 to 5 may generally be applicable to this tool. Similarly, such a tool may also be used in a method 500 as described above.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for handling a wind turbine tower section previously placed on one or more supports, the method comprising:

in a first tool, supporting a first end of the tower section in a first sling hanging between a first side portion of a first frame attached to a first wheeled platform and a second side portion of the first frame attached to a second wheeled platform of the first tool, each of the first side portion and the second side portion of the first frame having a first vertical beam, opposite ends of the first sling adjustably attached to the first vertical beams, wherein the first end of the tower section extends through the first frame axially past the first vertical beams and the first sling such that the first sling is axially spaced rearward from an end face of the first end of the tower section and extends under and fully supports the first end of the tower section from below without attachment to the end face of the first end of the tower section;

adjusting a length of the first sling between the first vertical beams based on a diameter of the first end of the tower section;

in a second tool, supporting a second end of the tower section in a second sling hanging between a first side portion of a second frame attached to a first wheeled platform and a second side portion of the second frame attached to a second wheeled platform of the second tool, each of the first side portion and the second side portion of the second frame having a second vertical beam, opposite ends of the second sling adjustably attached to the second vertical beams, wherein the second end of the tower section extends through the second frame axially past the second vertical beams and the second sling such that the second sling is spaced axially rearward from an end face of the second end of the tower section and extends under and fully supports the second end of the tower section from below without attachment to the end face of the second end of the tower section;

adjusting a length of the second sling between the second vertical beams based on a diameter of the second end of the tower section;

removing the one or more supports from below the tower section; and upending the tower section by lifting the second end of the tower section out from the second sling while the first end of the tower section is supported by the first sling of the first tool.

2. The method of claim 1, wherein the upending comprises rotating the first and second frame side portions of the first frame of the first tool about a substantially horizontal axis while lifting the second end of the tower section.

3. The method of claim 2, further comprising securing the first end of the tower section to the first frame by clamping an end flange of the first tower section to a beam that extends between the first side portion and the second side portion of the first frame.

4. The method of claim 1, wherein the one or more of the supports are cradles and the removing of the cradles comprises separating the cradles into two portions.

5. The method of claim 1, further comprising transporting the tower section supported in the first and second tools.

6. The method of claim 1, further comprising transferring the tower section to a vessel for further transport.

* * * * *